April 1, 1952

F. G. BACK ET AL 2,590,917

WIDE ANGLE LENS CONSTRUCTION

Filed March 5, 1951

Fig. 3

| LENS | $N_D$ | V | RADII | THICKNESSES SEPARATIONS |
|------|-------|-----|-------|-------------------------|
| $I_a$ | 1.5795 | 41.0 | $R_1=+57.25$ mm | $t_1=9.55$ mm |
| $I_b$ | 1.611 | 58.8 | $R_2=-19.59$ | $t_2=2.05$ |
|       |       |      | $R_3=+19.59$ | $d_1=7.50$ |
| $II_a$ | 1.5795 | 41.0 | $R_4=+210.00$ | $t_3=10.02$ |
| $II_b$ | 1.611 | 58.8 | $R_5=-22.89$ | $d_2=5.71$ |
|        |       |      | $R_6=-18.17$ | $d_3=3.06$ |
| $III_a$ | 1.517 | 64.5 | $R_7=+35.73$ | $d_4=$ variable |
| $III_b$ | 1.689 | 30.9 | $R_8=+57.98$ | $t_4=8.37$ |
|         |       |      | $R_9=-23.50$ | $t_5=2.00$ |
| $IV_a$ | 1.689 | 30.9 | $R_{10}=-46.00$ | $d_4=9.65$ |
| $IV_b$ | 1.517 | 64.5 | $R_{11}=+63.62$ | $t_6=2.05$ |
|        |       |      | $R_{12}=+27.21$ | $d_5=9.47$ |
| $V_a$ | 1.517 | 64.5 | $R_{13}=-42.77$ | $d_6=34.9$ |
| $V_b$ | 1.5795 | 41.0 | $R_{14}=+37.00$ | $t_7=8.50$ |
|       |       |      | $R_{15}=-22.40$ | $t_8=2.30$ |
|       |       |      | $R_{16}=-19170.0$ | $d_7=5.91$ |
| $VI_a$ | 1.6203 | 60.2 | $R_{17}=+23.35$ | $t_9=5.67$ |
| $VI_b$ | 1.617 | 36.6 | $R_{18}=$ inf. | $t_{10}=2.37$ |
|        |       |      | $R_{19}=+34.00$ | |

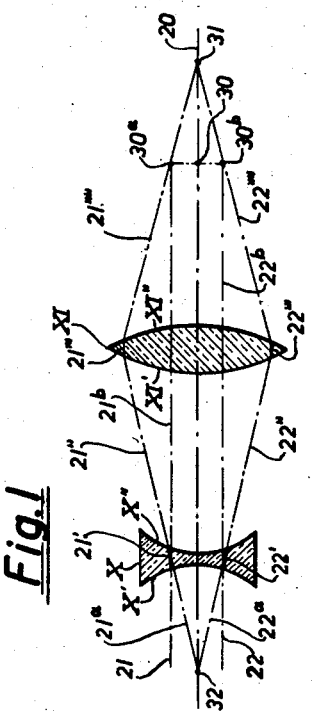

Fig. 1

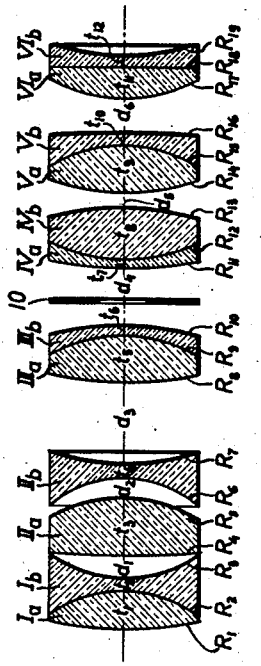

Fig. 2

INVENTOR.
Frank G. Back
Herbert Lowen

BY

Patented Apr. 1, 1952

2,590,917

UNITED STATES PATENT OFFICE 2,590,917

WIDE ANGLE LENS CONSTRUCTION

Frank G. Back, New York, and Herbert Lowen, Forest Hills, N. Y.

Application March 5, 1951, Serial No. 213,982

1 Claim. (Cl. 88—57)

This invention relates to a specific, novel and improved design and construction for wide angle lenses.

It is an object of the present invention to provide a novel construction for such "wide angle" or "short focal" lenses, wherein the back focal length of the lens is substantially greater than the equivalent focal length thereof.

It is a further object of this invention to provide wide angle lenses which have a large, relative aperture, are fully corrected for all aberrations, which will not cause vignetting even at small apertures, and which will show no noticeable lightfall-off towards the corners.

It is a further object of the present invention to provide a wide-angle lens, of such length that its field of view will not be obstructed by other lenses positioned on a lens-turret therewith.

In considering wide-angle or "short focal" lenses of the conventional type, it will be noted that in the conventional construction, the arrangement is such, that the principal points lie within the optical system, and thus the back focal length of the lens will at all times be shorter than its equivalent focal length.

This fact imposes confining restrictions upon the design of these lenses, because the back focal length otherwise will not suffice to accommodate the shutter mechanism of many cameras.

Because the conventional design is extremely limited in the number of lens-components, which can be employed, steep curves are required in order to achieve the desired power. This substantially limits the free diameter of the several lens components and a sharp decrease of transmission, towards the edge of the field, the vignetting due to the small diameter of the lens elements, occurs in conventional lenses of this type.

These limitations of lens design, due to the requirements of structural feasibility and the limitation in the number of available lens elements, substantially restrict the lens designer to the use of only very few suitable design-principles; i. e. the number of available freedoms, is extremely limited.

The principle of design, which was employed in the "Hypergon" lens by Hoegh, has been up to the present the basic model for most wide-angle lenses. This design, is substantially imperfect, and although some of the present day wide-angle lens designs are somewhat improved, the disadvantages of the basic design, have not been eliminated.

The "Hypergon," is a lens which has for instance no correction for color or spherical aberration and is limited to use at speeds not exceeding F 30, this disadvantage is still found in some of the present day designs.

The necessary limitation of the length of the conventional wide-angle lenses, in conjunction with the wide angle of field thereof, prevents the use of these lenses on turrets of motion-picture-cameras, for instance in combination with telephoto lenses mounted on the same turret, because the relatively great length of the telephoto lens will cut into the field of view of the wide angle lens.

In the present, novel construction for wide-angle lenses these disadvantages of the conventional design, are eliminated and overcome, without thereby sacrificing the advantages already inherent in the conventional construction.

A wide angle lens which possesses a substantial back focal length; has a large relative aperture; is corrected for all aberrations and will not cause vignetting (even at small apertures), and which will not have a noticeable light falloff towards the corners; is of such length that its field of vision will not be obstructed by other lenses, which are on the same turret therewith, is obtained when proceeding in accordance with the specific design and construction as set forth in the present invention.

These and other advantages and objects inherent in the present invention will become apparent in view of the preferred form of the invention, shown in the drawings, and described in detail with reference thereto.

In the drawings:

Fig. 1, is a side-view in elevation, showing a diagrammatical representation of the optical principle employed; and Fig. 2, is a vertical cross-section, showing the preferred form of the invention; and Fig. 3, is a table exemplifying same.

Referring now to the drawings, it will be seen in Fig. 1, that the lens system consists of negative lens member X, and positive lens member XI.

The axio-parallel rays 21 and 22, enter into the negative system X, and are refracted by its first surface X', in a direction away from the optical axis 20. The second surface X'', of the lens X, again further refracts the refracted rays 21' and 22', which passed through the lens X, and now pass to the inner surface XI', of positive lens XI, where said rays 21'' and 22'', are refracted towards the optical axis 20, and pass as rays 21''' and 22''', to the outer surface XI'', of positive lens XI. At the outer surface XI'' of said lens the rays 21'''' and 22'''', are refracted so as to converge as rays 21'''' and 22'''', towards the optical axis which they will intersect at the focal point 31.

The negative lens X, refracts the axio parallel rays 21 and 22, which originate at an object located at infinity in such manner that it seems as if the rays originate at the finite object point 32, as rays 21a, and 22a, respectively.

It is well known in the art how to accomplish the determination of a principal point, by graphic means. In determining in this manner the principal point, the equivalent focal length of the lens system will also be simultaneously determined.

Referring now to Fig. 1, it will be seen that the principal point 30, and concurrently the equivalent focal length of the system is determined in the following manner: The incoming parallel rays 21, and 22, are produced to points 30a and 30b, where the parallel rays 21b and 22b, will intersect the final outcoming rays 21'''' and 22''''. The projection of these intersecting points 30a and 30b, on the optical axis 20, determines the rear principal point 30, of the system. The distance between the principal point 30, and the focal point 31, constitutes the equivalent focal length of the optical system.

As will be seen in Fig. 1, the principal point 30, is located far behind the positive rear lens member XI, this arrangement permits (because the principal point 30, is a substantial distance rearward of the lens member XI), the splitting-up of each of the lens elements X, and XI, into a plurality of components.

Thus, because, in this arrangement it is possible to split the lens components, the system can be fully corrected for all aberrations. Furthermore it is feasible to employ relatively shallow curves which in turn permits the use of lens components of large diameter. The use of large diameter lens components eliminates undesirable vignetting which has been and is a basic detriment of conventional wide angle lenses.

Having now reference to Fig. 2, a wide angle lens construction in accordance with the foregoing principles (demonstrated in Fig. 1), is shown.

An example of the invention, illustrated particularly in Figure 2 and having the following values, also given in Figure 3 of the drawings as:

| Lens | $N_D$ | V | Radii | Thickness and Separations |
|---|---|---|---|---|
| $I_A$ | 1.5795 | 41.0 | $R_1 = +\ 57.25$ | $t_1 = 9.55$ |
| $I_B$ | 1.611 | 58.8 | $R_2 = -\ 19.59$ | $t_2 = 2.05$ |
|  |  |  | $R_3 = +\ 19.59$ | $d_1 = 7.50$ |
| $II_A$ | 1.5795 | 41.0 | $R_4 = +\ 210.10$ | $t_3 = 10.02$ |
|  |  |  | $R_5 = -\ 22.89$ | $d_2 = 5.71$ |
| $II_B$ | 1.611 | 58.8 | $R_6 = -\ 18.17$ | $t_4 = 3.06$ |
|  |  |  | $R_7 = +\ 35.73$ | $d_3 =$ Variable |
| $III_A$ | 1.517 | 64.5 | $R_8 = +\ 57.98$ | $t_5 = 8.37$ |
| $III_B$ | 1.689 | 30.9 | $R_9 = -\ 23.50$ | $t_6 = 2.00$ |
|  |  |  | $R_{10} = -\ 46.00$ | $d_4 = 9.65$ |
| $IV_A$ | 1.689 | 30.9 | $R_{11} = +\ 63.62$ | $t_7 = 2.05$ |
| $IV_B$ | 1.517 | 64.5 | $R_{12} = +\ 27.21$ | $t_8 = 9.47$ |
|  |  |  | $R_{13} = -\ 42.77$ | $d_5 = 3.49$ |
| $V_A$ | 1.517 | 64.5 | $R_{14} = +\ 37.00$ | $t_9 = 8.50$ |
| $V_B$ | 1.5795 | 41.0 | $R_{15} = -\ 22.40$ | $t_{10} = 2.30$ |
|  |  |  | $R_{16} = -1917.00$ | $d_6 = 5.91$ |
| $VI_A$ | 1.6203 | 60.2 | $R_{17} = +\ 23.35$ | $t_{11} = 5.67$ |
| $VI_B$ | 1.617 | 36.6 | $R_{18} =$ Inf. | $t_{12} = 2.37$ |
|  |  |  | $R_{19} = +\ 34.00$ |  | where $R$=radius of curvature; $t$=axial thickness; $d$=axial separation; $N_D$=index of refraction for sodium (Na) light of 5893 A; V=Abbé's dispersion figure; and F=equivalent focal length of the lens components numbered $I_A$ through $VI_B$ and the + and − values of R indicate the concave, respectively convex surfaces of the lenses is employed to set forth and demonstrate the preferred form of the present invention.

The negative component X, of Fig. 1, is split-up into negative doublets I and II, consisting of cemented doublet I, and broken contact-doublet II, each of which is achromatized and preferably constructed of "new" glass.

The preferred construction thus comprises the use of a high refractive, low dispersive crown for the negative main components Ib and IIb, and a low refractive high-dispersive Flint for the positive correctional components Ia and IIa. It must be realized that this glass combination is not suitable for spherical corrections if the two components are cemented but the negative spherical aberration of the negative system contributes to the overall correction of the entire optical system.

In this arrangement adequate correction for marginal rays and also for zonal rays is accomplished which however could not be achieved in conventional wide angle lenses.

When "new glass" is employed, the cemented surface and the airgap of the broken contact doublet II, acts negative or dispersive. When the cemented surface and the airgap are tangentially hit by oblique rays, astigmatism is caused, which of course is negative and therefore corrective, because the basic astigmatism of the entire optical system is positive. The negative power of the negative system favorably affects the Petzval sum of the entire system.

In considering the calculation of the system the numerical power of the correctional component of the uncemented doublet II, is somewhat smaller than the power of the cemented doublet I, this causes the rays inside the airgap to become substantially parallel thus permitting a change in the spacing between the two components IIa and IIb, without thereby affecting the longitudinal, chromatic and spherical correction of the doublet II.

The extra axial aberrations, the coma are affected by the alteration in the size of the airgap and thus an independent means for correction is available.

The spacing between the negative system X, and the positive system XI, may be altered by conventional means to permit the focusing on objects at finite distances. Whenever an object is not at infinity, the image formed by the negative system X, will not be formed at the focal point of said system X, but rather at a point closer to the said system. Consequently the final image point 31, of the positive system XI, would be shifted because the positive system XI, having its object at a different point, would therefore form an image further distant from its last element. Conventionally this effect is compensated for by moving the whole lens system away from the film plane.

In the present preferred form of this invention the negative system X, is moved in such manner that the virtual image of the object is always kept at the same distance from the positive system XI. The required movement of the negative system X, can be computed by means of standard formulae.

The advantages, gained by the aforesaid method of focusing are two-fold.

First, the relative aperture i. e. (ratio of equivalent focal length to diameter of the entrance pupil) is conventionally regarded as the index of the lens speed. This however is inaccurate as it can only be applied when aplanatic lenses focused at infinity are employed. The accurate index of lens speed is obtained when the sine of the half angle subtended by the exit pupil at the image point is taken.

In the conventional focusing procedure namely, by moving the whole lens system away from the image plane, the sine is decreased as its numerator i. e. the semi-diameter of the exit pupil remains constant and the denominator, the hypotenuse of the rectangle increases; therefore the numerical value of the sine decreases. In forming, by means of changing the spacing between the systems X and XI, the distance between the final image point 31, and the system XI, remains constant and thus the sine of the half angle of the exit pupil remains also unchanged.

It is obvious thus, that in this arrangement no loss of speed will occur when the lens is focused on objects at finite distances.

The second advantage which is accomplished by this method of focusing, is the high degree of correction. It has been proven mathematically by Clark Maxwell that any optical system can only be fully corrected for two conjugate points. Conventionally, lenses are corrected for an object-point at infinity with an image point at the focal point. In the present arrangement, the system XI, can be fully corrected because only one pair of conjugates are used. The correction of the negative system XI, of course changes for each pair of conjugate points, but the change of the total aberrations of the whole system is only a fraction of what it would be, were the focusing done by the moving of the entire system.

The positive rear system XI, is composed of four cemented positive doublets, III, IV, V and VI, each again achromatized within itself. Doublets III, and IV, are made of "old" glass. The main component being constructed of low-refractive low dispersive crown the corrective component of each consisting of extra dense high-refractive high-dispersive flint. Between the elements III, and IV, is the aperture stop 10. Each of the elements III, and IV, has the convex side of its cemented surface facing the aperture stop 10. As the axial parallel beam entering the lens has its greatest diameter between the elements III and IV, the glasses of which these lenses are composed so as to differ in their respective dispersion numbers —$v$— to allow for sufficiently flat radii. Element V, again consisting of "old" glass, but having a smaller difference in the respective dispersion numbers. This lens achieves the required final aplanatic correction. Element VI, consisting again of "new" glass, takes care of astigmatic residua.

In the preferred form of the invention the front negative system X, consists of a doublet I, and an uncemented doublet II, with a power of —20.3, the uncemented doublet II, having —16.3 diopters. The main components I$b$ and II$b$, of the system consist of dense barium crown 611588, and the correctional components I$a$ and II$b$, of the system are preferably constructed of light flint 580410.

The element components III$a$ and IV$b$, of the rear positive system are constructed of borosilicate crown 517645, and the element components III$b$ and IV$a$, are constructed of extra dense flint 689309. The element V is preferably of a construction wherein the element component V$a$, consists of borosilicate crown 517645, and element component V$b$, consists of light flint 580410. The element V, of the system in the preferred form of construction has a power of 11.7, diopters.

In said rear positive system the element component VI$a$, consists of dense barium crown 620620, and the element component VI$b$, consists of dense flint 617366, this element VI, has preferably a power of 10.8, diopters.

In the preferred arrangement the negative front system X, has a combined power of —44.7, diopters while the positive rear system XI, has a combined power of +38.9, diopters.

While in the above set forth preferred construction, specific elements have been recited in order to adequately illustrate the principles of this invention, it will be apparent to those skilled in the art that alterations and modifications in the construction and arrangement of the system may be made without thereby departing from the spirit of said invention. Changes of form, of details of construction and materials may be made without thereby departing from the spirit of invention set forth, which shall be limited only by the scope of the appended claims.

Having set forth our invention, what we desire to claim and secure by Letters Patent is:

A wide angle lens made substantially according to the following specifications:

| Lens | $N_D$ | V | Radii | Thicknesses and Separations |
|---|---|---|---|---|
| I$_A$ | 1.5795 | 41.0 | $R_1 = +$ 57.25 | $t_1 = 9.55$ |
| I$_B$ | 1.611 | 58.8 | $R_2 = -$ 19.59 | $t_2 = 2.05$ |
|  |  |  | $R_3 = +$ 19.59 | $d_1 = 7.50$ |
| II$_A$ | 1.5795 | 41.0 | $R_4 = +$ 210.10 | $t_3 = 10.02$ |
|  |  |  | $R_5 = -$ 22.89 | $d_2 = 5.71$ |
| II$_B$ | 1.611 | 58.8 | $R_6 = -$ 18.17 | $t_4 = 3.06$ |
|  |  |  | $R_7 = +$ 35.73 | $d_3 = $ Variable |
| III$_A$ | 1.517 | 64.5 | $R_8 = +$ 57.98 | $t_5 = 8.37$ |
| III$_B$ | 1.689 | 30.9 | $R_9 = -$ 23.50 | $t_6 = 2.00$ |
|  |  |  | $R_{10} = -$ 46.00 | $d_4 = 9.65$ |
| IV$_A$ | 1.689 | 30.9 | $R_{11} = +$ 63.62 | $t_7 = 2.05$ |
| IV$_B$ | 1.517 | 64.5 | $R_{12} = +$ 27.21 | $t_8 = 9.47$ |
|  |  |  | $R_{13} = -$ 42.77 | $d_5 = 3.49$ |
| V$_A$ | 1.517 | 64.5 | $R_{14} = +$ 37.00 | $t_9 = 8.50$ |
| V$_B$ | 1.5795 | 41.0 | $R_{15} = -$ 22.40 | $t_{10} = 2.30$ |
|  |  |  | $R_{16} = -$ 1917.00 | $d_6 = 5.91$ |
| VI$_A$ | 1.6203 | 60.2 | $R_{17} = +$ 23.35 | $t_{11} = 5.67$ |
| VI$_B$ | 1.617 | 36.6 | $R_{18} = $ Inf. | $t_{12} = 2.37$ |
|  |  |  | $R_{19} = +$ 34.00 |  |

F = Equivalent Focal Length = 15.

where the lens elements are numbered in the first column in order from front to rear and the corresponding refractive indices and V values are given in the next two columns, where the radii R, thicknesses $t$ and separations $d$, each numbered from front to rear, are given in the last two columns, where F is the focal length of the objectives and where the + and — values of R indicate surfaces respectively convex and concave to the front.

FRANK G. BACK.
HERBERT LOWEN.

REFERENCES CITED

The following references are of record in the file of this patent:

UNITED STATES PATENTS

| Number | Name | Date |
|---|---|---|
| 1,578,259 | Boegehold | Mar. 30, 1926 |
| 1,863,099 | Bowen | June 14, 1932 |
| 1,897,262 | Kitroser | Feb. 14, 1933 |
| 1,910,492 | Mellor | May 23, 1933 |
| 1,955,590 | Lee | Apr. 17, 1934 |
| 2,341,385 | Kingslake et al. | Feb. 8, 1944 |
| 2,548,569 | Tolle | Apr. 10, 1951 |